(12) United States Patent
Jackson et al.

(10) Patent No.: US 6,565,680 B1
(45) Date of Patent: May 20, 2003

(54) SUPERALLOY WELD COMPOSITION AND REPAIRED TURBINE ENGINE COMPONENT

(75) Inventors: Melvin Robert Jackson, Niskayuna, NY (US); Charles Gitahi Mukira, Clifton Park, NY (US); Richard John Grylls, Loveland, OH (US); Thomas Joseph Kelly, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/472,918

(22) Filed: Dec. 27, 1999

(51) Int. Cl.[7] .............................................. C22C 19/05
(52) U.S. Cl. ...................... 148/428; 420/445
(58) Field of Search .................... 148/428; 420/445, 420/448

(56) References Cited

U.S. PATENT DOCUMENTS

| | | | |
|---|---|---|---|
| 4,126,495 A | * 11/1978 | Ghosh ......................... | 148/32 |
| RE29,920 E | * 2/1979 | Baldwin ...................... | 420/445 |
| 4,386,976 A | * 6/1983 | Benn et al. .................. | 148/410 |
| 4,719,080 A | * 1/1988 | Duhl et al. ................... | 420/443 |
| 4,764,225 A | * 8/1988 | Shankar et al. .............. | 148/404 |
| 4,801,513 A | * 1/1989 | Duhl et al. ................... | 428/678 |
| 4,878,965 A | * 11/1989 | Gostic et al. ................ | 148/404 |
| 5,035,958 A | * 7/1991 | Jackson et al. .............. | 428/553 |
| 5,043,138 A | * 8/1991 | Darolia et al. ............... | 420/443 |
| 5,240,491 A | * 8/1993 | Budinger et al. ............. | 75/255 |
| 5,240,518 A | * 8/1993 | Wortman et al. ............ | 148/404 |
| 5,395,584 A | * 3/1995 | Berger et al. ................ | 420/443 |
| 5,413,876 A | * 5/1995 | Santella et al. .............. | 428/680 |
| 5,660,649 A | * 8/1997 | Bornstein et al. ............ | 148/404 |
| 5,851,318 A | * 12/1998 | Klower ........................ | 148/410 |
| 5,897,801 A | * 4/1999 | Smashey et al. ..... | 219/137 WM |
| 5,916,382 A | * 6/1999 | Sato et al. ................... | 148/404 |
| 6,051,083 A | * 4/2000 | Tamaki et al. ............... | 148/410 |

FOREIGN PATENT DOCUMENTS

| | | |
|---|---|---|
| EP | 0 962542 A1 | * 12/1999 |
| EP | 1 054072 A1 | * 11/2000 |

OTHER PUBLICATIONS

ASM Handbook, vol. 2: Properties and Selection: Nonferrous ALloys and Special–Purpose Materials, 1992, pub. by ASM International, p. 444–445.*

* cited by examiner

*Primary Examiner*—Roy King
*Assistant Examiner*—Harry D. Wilkins, III
(74) *Attorney, Agent, or Firm*—Paul J. DiConza; Noreen C. Johnson

(57) ABSTRACT

A superalloy weld composition includes:
  up to about 5.1 wt % Co;
  about 7.2 to about 9.5 wt % Cr;
  about 7.4 to about 8.4 wt % Al;
  about 4.3 to about 5.6 wt % Ta;
  about 0.1 to about 0.5 wt % Si;
  about 0.1 to about 0.5 wt % Hf;
  up to about 0.05 wt % C;
  up to about 0.05 wt % B;
  about 0 to about 2.2 Re;
  about 2.7 to about 4.4 wt % W; and
  balance Ni and typical impurities.

7 Claims, 3 Drawing Sheets

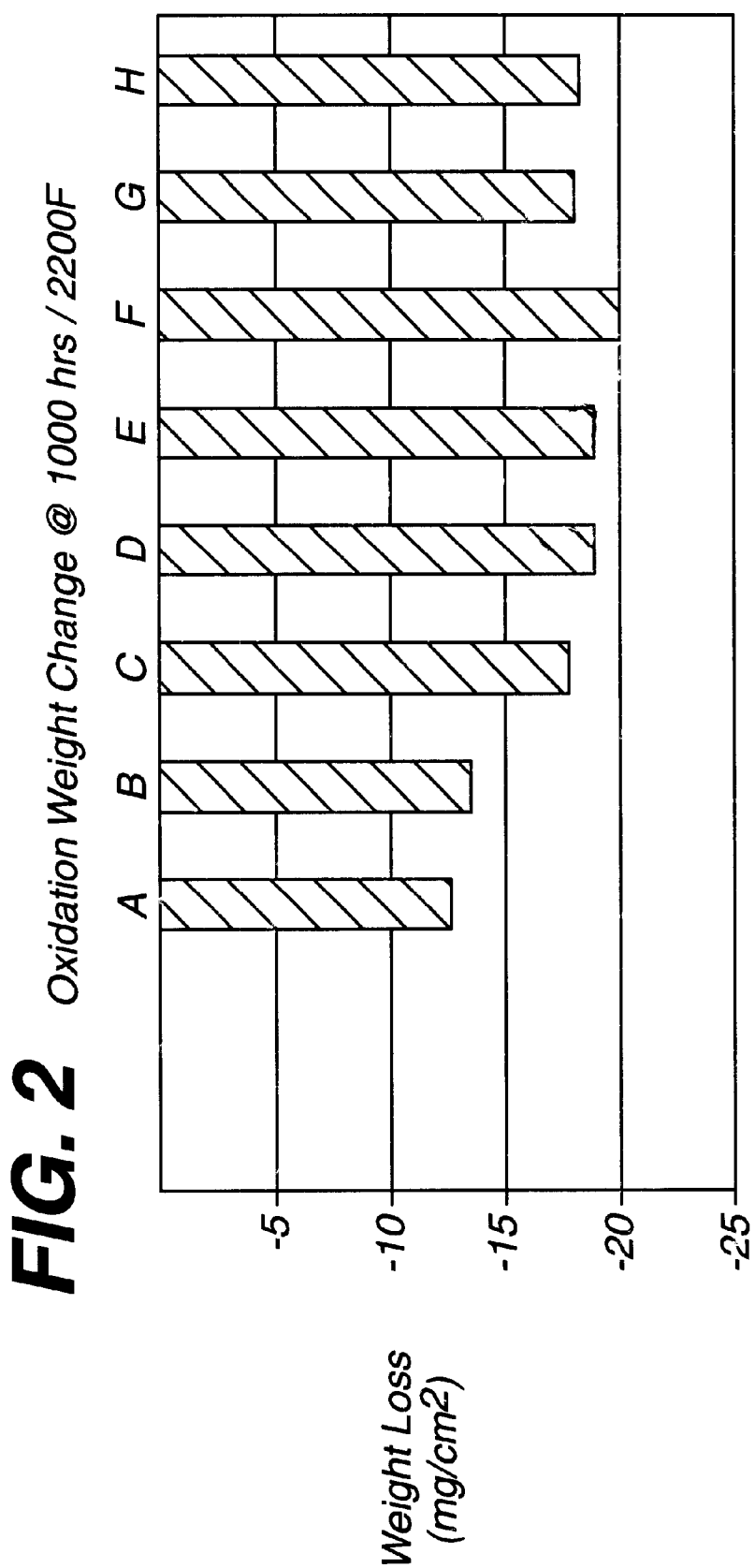

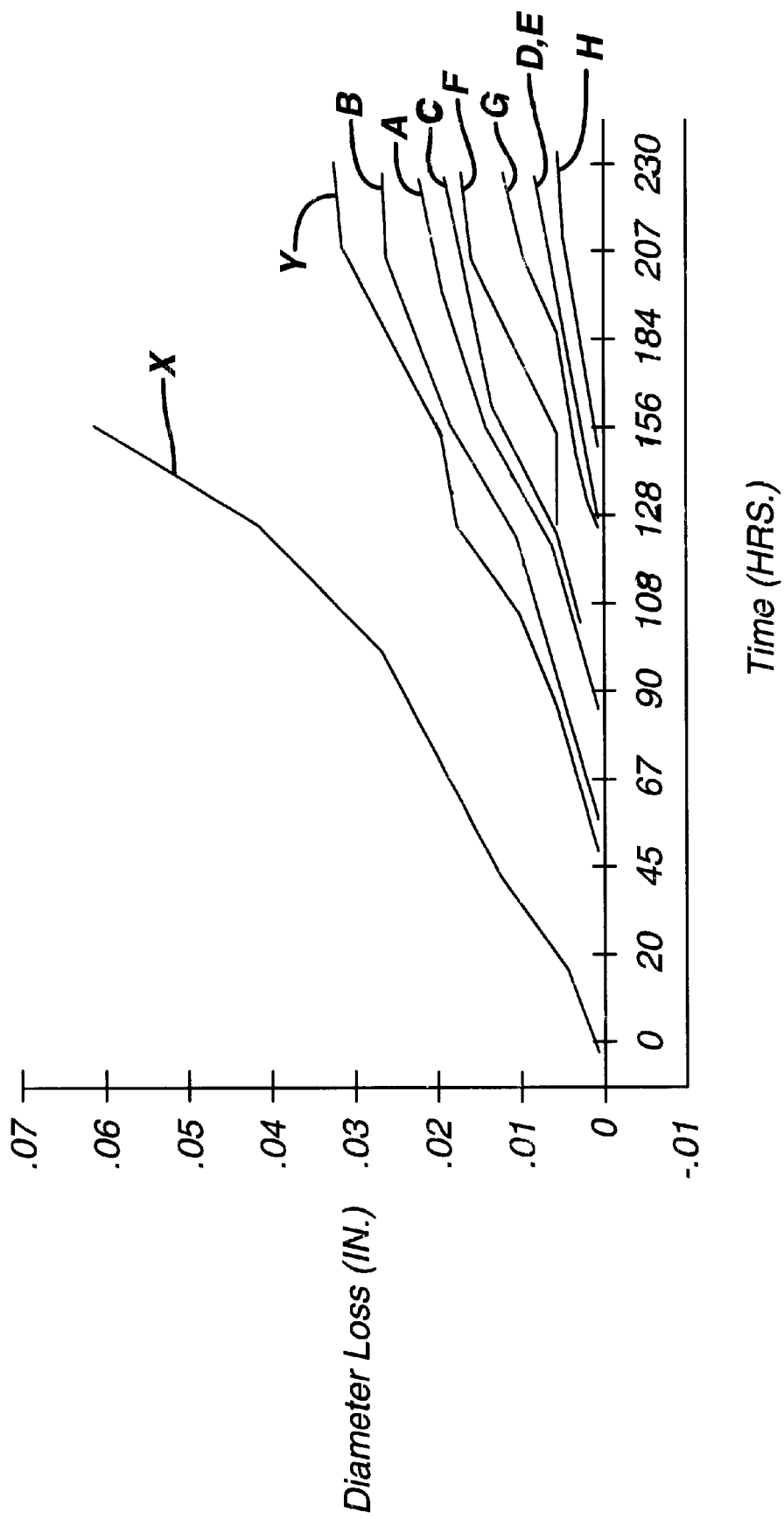

SUPERALLOY WELD COMPOSITION AND REPAIRED TURBINE ENGINE COMPONENT

BACKGROUND OF THE INVENTION

The present invention is drawn to the field of turbine engine components. More particularly, the present invention is drawn to a superalloy weld composition and a repaired component utilizing a superalloy weld composition.

The efficiency of gas turbine engines is dependent in part on the amount or degree of leakage of combustion gases between the turbine blades or buckets and the shroud of the turbine section of the engine. To minimize the gap, the tips are generally subjected to a precise machining operation. However, due to machining tolerances, thermal expansion differences between the components, and dynamic effects, typically some degree of rubbing between the tips and the shroud occurs.

Due to the rubbing contact, such as after extended service in the field, the base material of the blade is exposed, generally leading to corrosion and/or oxidation of the blade. Extended corrosion or oxidation leads to an increase in leakage between the blade and the shroud and consequent performance and efficiency losses. It has become commonplace to repair worn components as a cost-effective option to replacement, in view of the relative cost of turbine components such as blades or buckets. In a known repair technique, a weld wire formed of a weldable superalloy composition is used in a 'build-up' process to restore the blade to its original or near-original geometric configuration. For example, a nickel-base superalloy weld wire can be used in a tungsten arc welding process by making multiple passes over the tip region of a nickel-base superalloy blade. Following welding, the tip region is machined.

While there are numerous commercially available weld repair alloys, there continues to be a demand for further improved weld alloys, particularly, nickel-base weld alloys for nickel-base superalloy components. In this regard, the present inventors have recognized a need for a nickel-base superalloy that has improved oxidation resistance over state of the art repair alloys, and requisite high-temperature tensile strength and creep resistance. It is also desired to provide an alloy that has compositional uniformity to enable formation into a wire, and which has room temperature weldability (ductility). Furthermore, improvements in rupture lives of repair alloys are also sought.

BRIEF SUMMARY OF THE INVENTION

One embodiment of the present invention calls a superalloy weld composition, including:

up to about 5.1 wt % Co;
about 7.2 to about 9.5 wt % Cr;
about 7.4 to about 8.4 wt % Al;
about 4.3 to about 5.6 wt % Ta;
about 0.1 to about 0.5 wt % Si;
about 0.1 to about 0.5 wt % Hf;
up to about 0.05 wt % C;
up to about 0.05 wt % B;
about 0 to about 2.2 Re;
about 2.7 to about 4.4 wt % W; and
balance Ni.

Another embodiment of the present invention is drawn to a repaired turbine engine component having a repaired region and an in-tact region. The repaired region has a composition as provided above.

BRIEF DESCRIPTION OF THE DRAWINGS

FIG. 2 is a bar graph representing oxidation resistance in static air furnace cycling of several alloy compositions of the present invention, at 1000 hours and 2200° F.

FIG. 3 is a plot representing oxidation resistance according to Becon cycling for several alloy compositions of the present invention and two commercially available alloys, at 2200° F.

DETAILED DESCRIPTION OF THE INVENTION

Figure 1:
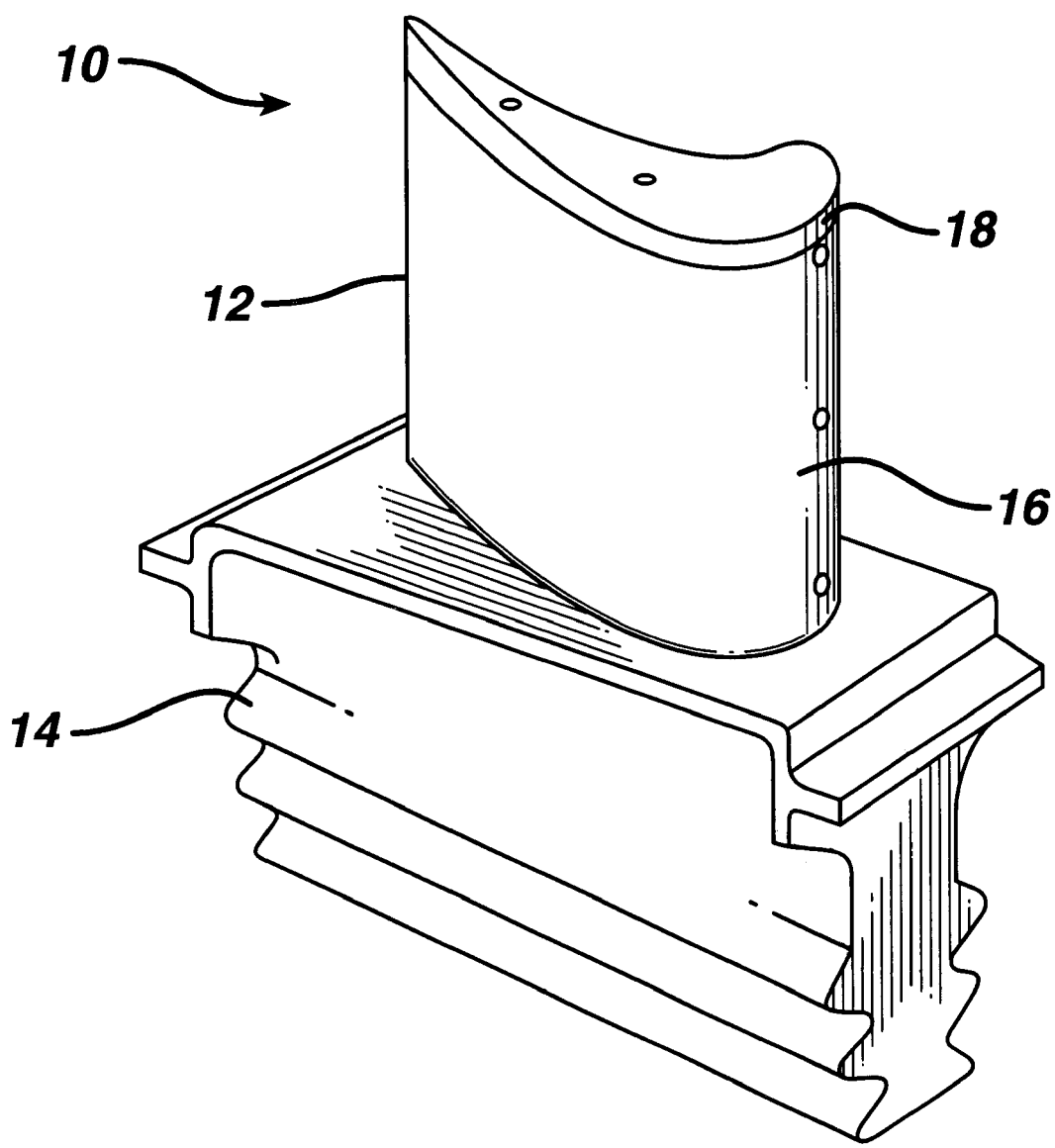
FIG. 1 is an elevated perspective view of a repaired turbine bucket of a high-pressure stage of a turbine engine.

Embodiments of the present invention provide a repaired turbine engine component and a weld composition for repairing turbine engine components. The turbine engine component is typically formed of a superalloy material, known for high temperature performance in terms of tensile strength, creep resistance, oxidation resistance, and corrosion resistance, for example. The superalloy component is typically formed of a nickel-base alloy, wherein nickel is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene®80-, Rene®95, Rene®142, and Rene®N5 alloys), and Udimet®, and include directionally solidified and single crystal superalloys.

The form of the turbine engine component varies among combustor liners, combustor domes, shrouds, buckets or blades, nozzles or vanes. The component is most typically an airfoil, including stationary airfoils such as nozzles or vanes, and rotating airfoils including blades and buckets. Blades and buckets are used herein interchangeably; typically a blade is a rotating airfoil of an aircraft turbine engine, and a bucket is a rotating airfoil of a land-based power generation turbine engine. In the case of a blade or bucket, typically the region under repair is the tip region that is subject to wear due to rubbing contact with a surrounding shroud, and to oxidation in the high-temperature environment. In the case of a nozzle or vane, typically the area under repair is the leading edge which is subject to wear due to exposure of the highest velocity gases in the engine at elevated temperature. The repair weld composition may be used alone, as a filler material, or in combination with an insert, such as a contoured plate that is welded in place along the leading edge of a nozzle or vane.

Turning to FIG. 1, a repaired airfoil, particularly, a repaired blade or bucket 10 of a jet engine or power generation turbine engine is illustrated. The bucket 10 includes an airfoil portion 12 and dovetail portion 14. The airfoil portion 12 has an intact region 16, and a repaired region 18. Prior to repair, the bucket is removed from the turbine engine, and cleaned by a conventional process to remove deposited foreign materials as well as any oxidation and corrosion. The cleaned coating is removed from the region near the tip, and the tip is ground back to near the tip cavity and is then repaired by a welding technique. Typically tungsten arc inert gas (TIG) welding is used although other welding techniques may be employed such as gas-metal arc welding, resistance welding, electron beam welding, plasma welding, and laser welding. In the TIG welding process, heat is produced between the workpiece, e.g., the tip of bucket 10, and the tungsten electrode. A nickel-base weld wire having a composition as described herein is used as a filler metal. Multiple passes are made around the periphery of the tip thereby building up the tip to approximate the original geometry. The repair may be accomplished with heat input only from the weld process, or the part may be additionally heated in the region being repaired. The repair process is completed by additional machining, as well as any coating processes (e.g., overlay coatings, diffusion coatings, thermal barrier coatings) for further protection of the blade or bucket.

According to an embodiment of the present invention, a weld alloy composition includes about up to about 5.1 wt % Co; about 7.2 to about 9.5 wt % Cr; about 7.4 to about 8.4 wt % Al; about 4.3 to about 5.6 wt % Ta; about 0.1 to about 0.5 wt % Si; about 0.1 to about 0.5 wt % Hf; up to about 0.05 wt % C; up to about 0.05 wt % B; about 0 to about 2.2 Re; about 2.7 to about 4.4 wt % W; and balance Ni.

Preferably, the composition contains about 3 to about 4.0 wt % Co; about 7.2 to about 8.5 wt % Cr; about 5.0 to 5.6 Ta; about 0.1 to 0.25 Hf, and about 1.0 to about 2.2 Re. According to embodiments of the present invention, the volume fraction of beta-NiAl is minimized or eliminated by employing compositions within the above ranges. By minimizing or eliminating the volume fraction of beta-NiAl, rupture lives of the alloys are improved.

Weld alloys according to embodiments of the present invention (listed in the Table, in weight percent) were cast and directionally solidified (DS) into rectangular ingots having the dimensions 15 cm×3 cm×1 cm. From each of the ingots, oxidation pins, compact rupture (tensile) specimens, and weld wires were formed by electro-discharge machining (EDM). While the particular form of the alloy body differed depending on the testing technique under investigation, embodiments of the present invention typically take the form of a weld wire in practical use. In this regard, the uniformity of compositions of embodiments of the present invention is controllable to enable wire formation.

Turning to FIGS. 2 and 3, the results are shown for oxidation resistance for selected compositions. FIG. 2 illustrates the results of static air furnace cycling. FIG. 2 illustrates the results of isothermal oxidation. Oxidation pins were cycled to 2200° F. over a 1000 hour period, and total weight loss was measured. Samples were measured dimensionally, and were weighed before test and periodically during test, to determine the weight change per unit area. Samples were exposed in static air for 60 minutes in a 2200 F. furnace, and were cycled to room temperature in 5 minutes, re-heated in 5 minutes to 2200 F. for the subsequent 60 minute exposure, this process repeated except when samples were interrupted for weight change measurement. In comparison, commercially available alloy Y lost greater than 40 mg/cm$^2$. The alloy compositions of the present invention preferably have a weight loss according to the static air furnace cycling test less than 20 mg/cm$^2$, such as less than 18 mg/cm$^2$.

FIG. 3 shows the results of a cyclical oxidation test. Oxidation pins were loaded into a burner rig test (Becon Test), and for each cycle, were heated to 2200° F. for 30 seconds, and held at 2200° F. for 2.5 minutes, and force air cooled for 2 minutes. The test specimens were weighed approximately once/day. The y-axis, diameter loss, represents the extent of oxidation. As shown by the plots, alloys according to embodiments of the present invention showed superior resistance to oxidation as compared to the commercially available alloys X and Y, which indicates that alloy compositions according to embodiments of the present invention have longer service lives than state of the art alloys X and Y.

Beyond demonstrating exceptional oxidation resistance, the alloys were then tested for rupture behavior. A 2000° F./10 ksi rupture test was employed to determine whether the alloys according to the present invention had sufficient rupture lives. Samples with a gage length of 0.5" and a gage diameter of 0.08" were heated in an air furnace to 2000 F., and when temperature was stabilized, a dead-weight load was applied corresponding to an initial 10 ksi stress on the gage diameter. The dead weight load and the 2000 F. sample temperature were maintained constant throughout the test, and life was determined as the time to sample failure by creep rupture. As a result, it was discovered that the rupture lives were a strong function of the Cr, Al and Si contents, high levels of which lead to formation of an undesirable beta-NiAl phase. Rupture life data have shown that rupture life can be improved if the beta-NiAl is reduced to a level of not greater than about 4.0 volume percent. A near zero beta-NiAl provided a rupture life on the order of 300 hours according to 2000° F./10 ksi testing, while 4.0 vol % was responsible for a significant drop in rupture life, to about 25 to 50 hours. Accordingly, Cr, Al and Si levels are maintained within the ranges discussed above with respect to the compositional parameters according to embodiments of the present invention. Empirical testing and regression analysis have shown that the volume percent of the beta-NiAl phase can be estimated by the equation (Al, Si, and Cr in atom percent):

$$NiAl(vol\ \%) = -119 + 5.6(Al) + 4.9(Si) + 2.6(Cr)$$

Further, the rupture life can be estimated by the following equation:

$$\text{Rupture life(hours)} = 3238 - 134(Al) - 76.7(Cr) - 141(Si).$$

Preferably, the rupture life of the alloys according to the present invention is greater than about 100 hours, more preferably greater than about 150 hours. Rupture lives greater than about 200 to 250 hours are considered excellent.

Room temperature weldability was examined by bead-on-plate TIG welding on nickel-base superalloy plates of the alloy compositions. A fluorescent die penetrant and X-ray analysis techniques were used to check for cracks. None of the alloys showed post-weld cracking, and post-heat cracking was nominal, indicating that the alloy compositions are room temperature weldable. In this regard, it is noted that the alloys have been found to have a gamma/gamma prime matrix microstructure, having an interdendritic beta phase which is minimized.

Further testing was done to examine the room temperature elongation properties. The values ranged between 8 and 22%, with preferable compositions being greater than about 12%, more preferable greater than about 18%

According to embodiments of the present invention, alloy compositions have been provided that have requisite, high temperature rupture properties, high temperature oxidation resistance, and room temperature processibility (wire making and grinding). While embodiments of the present invention have been described herein with particularity, it is understood that those of ordinary skill in the art may make modifications thereto and still fall within the scope of the appended claims.

TABLE

| SAMPLE | Ni | Cr | Co | Al | Ta | Si | Hf | C | B | Re | W | Mo |
|---|---|---|---|---|---|---|---|---|---|---|---|---|
| A | 69.40 | 8.23 | 3.10 | 7.83 | 5.40 | 0.35 | 0.16 | 0.02 | 0.01 | 1.63 | 3.88 | |
| B | 70.35 | 7.30 | 3.10 | 7.82 | 5.40 | 0.35 | 0.16 | 0.02 | 0.01 | 1.63 | 3.87 | |
| C | 68.75 | 8.27 | 3.12 | 8.35 | 5.44 | 0.35 | 0.16 | 0.02 | 0.01 | 1.64 | 3.90 | |
| D | 69.69 | 7.34 | 3.12 | 7.86 | 5.44 | 0.84 | 0.16 | 0.01 | 0.01 | 1.64 | 3.89 | |
| E | 69.70 | 7.34 | 3.12 | 8.34 | 5.43 | 0.35 | 0.16 | 0.01 | 0.01 | 1.64 | 3.90 | |
| F | 69.04 | 7.38 | 3.14 | 8.38 | 5.46 | 0.85 | 0.16 | 0.01 | 0.01 | 1.65 | 3.92 | |
| G | 68.74 | 8.27 | 3.12 | 7.87 | 5.44 | 0.84 | 0.16 | 0.01 | 0.01 | 1.64 | 3.90 | |
| H | 68.08 | 8.32 | 3.14 | 8.39 | 5.47 | 0.85 | 0.16 | 0.01 | 0.01 | 1.65 | 3.92 | |
| X | 58.45 | 6.80 | 11.75 | 6.12 | 6.35 | | 1.50 | 0.12 | 0.015 | 2.80 | 4.90 | 1.50 |
| Y | 63.1 | 7.0 | 7.5 | 6.2 | 6.5 | | 0.15 | 0.05 | 0.004 | 3.00 | 5.00 | 1.50 |

What is claimed is:

1. A superalloy weld composition, consisting essentially of:
   about 7.2 to about 9.5 wt % Cr;
   about 7.4 to about 8.4 wt % Al;
   about 4.3 to about 5.6 wt % Ta;
   about 0.1 to about 0.5 wt % Si;
   about 0.1 to about 0.5 wt % Hf;
   up to about 0.05 wt % C;
   up to about 0.05 wt % B;
   about 0 to about 2.2 Re;
   about 2.7 to about 4.4 wt % W; and
   balance Ni and typical impurities.

2. The composition of claim 1, wherein
   Cr is about 7.2 to about 8.5 wt %;
   Ta is about 5 to 5.6 wt %;
   Hf is about 0.1 to about 0.25 wt %;
   Re is about 1.0 to about 2.2 wt %.

3. The composition of claim 1, wherein the composition loses less than about 20 mg/cm$^2$, after 1000 hours of cycling to 2200° F.

4. The composition of claim 1, wherein the composition has a rupture life not less than about 100 hours, according to a 2000° F./10 ksi rupture test.

5. The composition of claim 4, wherein the composition has a rupture life not less than about 150 hours.

6. The composition of claim 5, wherein the composition has a rupture life not less than about 200 hours.

7. The composition of claim 1, wherein the composition has a beta-NiAl volume percent not greater than about 4.0 vol %.

* * * * *